(12) United States Patent
Zubko et al.

(10) Patent No.: US 9,771,294 B1
(45) Date of Patent: Sep. 26, 2017

(54) BASALT FIBERS PRODUCED FROM HIGH TEMPERATURE MELT

(71) Applicant: Americas Basalt Technology, LLC, Fort Lauderdale, FL (US)

(72) Inventors: Yevgeniy Zubko, Ivano-Frankivsk (UA); Yurii Zubko, Ivano-Frankivsk (UA)

(73) Assignee: Americas Basalt Technology, LLC, Fort Lauderdale, FL (US)

( * ) Notice: Subject to any disclaimer, the term of this patent is extended or adjusted under 35 U.S.C. 154(b) by 0 days.

(21) Appl. No.: 15/135,478

(22) Filed: Apr. 21, 2016

(51) Int. Cl.
 *C03B 5/02* (2006.01)
 *C03B 37/04* (2006.01)

(52) U.S. Cl.
 CPC .............. *C03B 5/021* (2013.01); *C03B 37/04* (2013.01)

(58) Field of Classification Search
 None
 See application file for complete search history.

(56) References Cited

U.S. PATENT DOCUMENTS

| | | | | |
|---|---|---|---|---|
| 4,199,336 A * | 4/1980 | Rittler | ...................... | C03B 32/02 501/35 |
| 5,601,628 A * | 2/1997 | Battigelli | .............. | C03B 37/045 65/461 |
| 5,622,671 A * | 4/1997 | Pellegrin | .................. | D01D 5/18 264/209.2 |
| 5,674,307 A * | 10/1997 | Huey | .................... | C03B 37/045 264/8 |
| 5,954,852 A * | 9/1999 | Jensen | .................. | C03B 37/055 65/377 |
| 6,125,660 A * | 10/2000 | Gorobinskaya | ........... | C03B 5/04 65/474 |
| 6,158,249 A | 12/2000 | Battigelli et al. | | |
| 6,577,667 B1 * | 6/2003 | Romer | .................... | C03B 5/021 373/138 |

(Continued)

FOREIGN PATENT DOCUMENTS

EP 2000442 A2 12/2008
KR 2012116031 * 10/2012

(Continued)

OTHER PUBLICATIONS

Cold-Crucible Induction Melter Design and Development Dirk Gombert and John R. Richardson Bechtel BWXT Idaho, LLC Idaho National Engineering and Environmental Laboratory, P.O. Box 1625 Idaho Falls, Idaho 83415-3710 Sep. 25, 2002.*

(Continued)

*Primary Examiner* — Jodi C Franklin
(74) *Attorney, Agent, or Firm* — Cooley LLP

(57) ABSTRACT

Methods, systems and apparatus for producing continuous basalt fibers, microfibers, and microspheres from high temperature melts are disclosed. A cold crucible induction furnace is used to super heat crushed basalt rock to form a melt. The melt is cooled prior to forming a fiber. The fiber produced from the superheated melt possesses superior properties not found with conventional basalt fibers produced in gas furnaces. In some implementations, the superheated melt is spun into continuous basalt fibers. In some implementations, the superheated melt is blown into microfibers and microspheres.

18 Claims, 6 Drawing Sheets

(56) References Cited

U.S. PATENT DOCUMENTS

| | | | |
|---|---|---|---|
| 6,647,747 B1* | 11/2003 | Brik | B82Y 20/00 |
| | | | 65/135.1 |
| 7,073,353 B2 | 7/2006 | Noack | |
| 7,968,620 B2 | 6/2011 | Gajiwala | |
| 8,042,362 B2 | 10/2011 | Kibol et al. | |
| 8,042,363 B2 | 10/2011 | Kibol et al. | |
| 8,501,643 B2 | 8/2013 | Kamiya et al. | |
| 8,806,900 B2* | 8/2014 | Brik | C03B 5/265 |
| | | | 65/145 |
| 9,090,508 B2 | 7/2015 | Gong et al. | |
| 2004/0056026 A1* | 3/2004 | Jakes | C03B 5/023 |
| | | | 219/701 |
| 2004/0115439 A1 | 6/2004 | Degroote | |
| 2005/0005646 A1* | 1/2005 | Leister | C03B 1/02 |
| | | | 65/134.5 |
| 2005/0083989 A1* | 4/2005 | Leister | C03B 5/021 |
| | | | 373/27 |
| 2006/0218972 A1* | 10/2006 | Brik | C03B 5/265 |
| | | | 65/492 |
| 2009/0031759 A1* | 2/2009 | Evans | C03B 37/048 |
| | | | 65/525 |
| 2009/0320528 A1* | 12/2009 | Skarzenski | B23K 31/02 |
| | | | 65/494 |
| 2010/0313606 A1 | 12/2010 | Kibol et al. | |
| 2013/0239503 A1 | 9/2013 | Miller et al. | |
| 2013/0303822 A1* | 11/2013 | Pegg | G21F 9/16 |
| | | | 588/11 |

FOREIGN PATENT DOCUMENTS

| | | |
|---|---|---|
| WO | WO 2007/147571 | 12/2007 |
| WO | WO 2015/028380 | 3/2015 |

OTHER PUBLICATIONS

Tatarintseva et al. "Effect of Production Conditions of Basalt Glasses on Their Physicochemical Properties and Drawing Temperature Range of Continuous Fibers", Glass Physics and Chemistry, 2012, vol. 38, No. 1, pp. 89-95.*

ASM International The Theory of Heating by Induction Practical Induction Heat Treating 2001 as viewed at http://www.asminternational.org/documents/10192/1849770/ACFAA5C.pdf on Mar. 16, 2017.*

Consarc An inductotherm group as early as Mar. 19, 2014 as viewed at http://consarceng.com/wp-content/uploads/sites/12/2015/04/ism.pdf. On Mar. 16, 2017.*

* cited by examiner

BASALT FIBERS PRODUCED FROM HIGH TEMPERATURE MELT

BACKGROUND

Basalt is an abundant igneous rock formed from by lava cooling on the earth's surface. Though the composition of basalt varies, basalt typically is comprised of 45-55 wt. % silica ($SiO_2$), 2-6 wt. % total alkalis, 0.5-2.0 wt. % titanium dioxide ($TiO_2$), 5-14 wt. % iron oxides, and 14 wt. % or more ($Al_2O_3$). Contents of calcium oxide (CaO) are typically around 10 wt %, and magnesium oxide (MgO) typically ranges 5 to 12 wt %. The composition of Basalt can also be describe in terms of its mineral compositions which include amphibole, pyroxene, feldspar, plagioclase feldspar, feldspathoids, augite, and olivine.

Basalt can be melted and processed into a fiber. Basalt rock is plentiful and inexpensive, however a great deal of energy is required to melt the basalt rock and form it into a fiber. Conventional basalt fibers may not be suitable for certain applications due to the prevalence of defects which cause the fibers to break. Defects, including fissures and inclusions, result in weaker areas of the fiber. These weak areas of the fiber are prone to breaking not only during the fiber manufacturing process, but also during the manufacture of end products.

Conventional basalt fibers can be made using gas furnaces. For example U.S. Pat. No. 6,125,660 to Gorobinskaya, et al., discloses a method of using a gas furnace to melt basalt at a temperature of 1300° C. to 1450° C. The gas furnace is lined with a refractory material which resists heat.

Another example of producing a conventional basalt fiber is found in U.S. Pat. No. 8,042,363 to Kibol, et al. This patent discloses a method of producing basalt fibers of various chemical compositions using a gas furnace with a temperature ranging from 1400° C. to 2000° C. Another example of producing a basalt fiber is found in U.S. Pat. No. 8,042,362 to Kibol, et al. This patent discloses a specialized apparatus for processing a basalt melt. The furnace is heated using natural gas by means of gas-air burners at a temperature above 1500° C. and the furnace is lined with refractory materials. The basalt is melted in an oxidative medium with excess air supplied by blowers. The process results in the generation of combustion gases including poisonous carbon monoxide and the greenhouse gas carbon dioxide.

SUMMARY

The inventors have recognized and appreciated certain improvements to conventional rock fiber production techniques. In various inventive embodiments discussed in detail herein, certain improvements relate to high quality rock fibers exhibiting improved physical properties with less defects, and produced be an efficient, continuous process.

For example, the present disclosure includes a method of producing a fiber including charging a quantity of a rock into an induction furnace, heating the quantity of the rock in the induction furnace to a first temperature of at least 1500° C. to form a melt, and forming a fiber from the melt. The melt can have viscosity less than 500 cP within the furnace. The rock can be an igneous rock including basalt. The quantity of the rock can be at least 100 kilograms. The rock may be heterophasic. The rock can includes polycrystalline components.

In the various exemplary embodiments discussed herein, a furnace can be an induction furnace. The induction furnace has an interior that contains substantially no refractory lining. The induction furnace can be a cold crucible induction furnace that operates at a first temperature from about 1500° C. to about 2000° C. The first temperature can also be at least about 2000° C. The first temperature can be from about 2000° C. to about 2300° C.

The melt can be substantially homogeneous. The melt can be about at least 80% amorphous, about at least 90% amorphous, about at least 95% amorphous, about at least 98% amorphous, and greater than about 99% amorphous.

The method can further include cooling the melt to a second temperature less than 1500° C. prior to forming the fiber. The method can also include forming the fiber from the melt by spinning the melt though a bushing.

The fiber can be 1 micron to 3 microns. The fiber can also be 4 microns to 13 microns. The fiber can also be 7 microns to 13 microns. The fiber can also be 8 microns to 10 microns.

The method can further include applying a spin finish to the fiber. The spin finish can contain silicone.

In the various exemplary embodiments discussed herein, a method of producing a fiber includes charging the quantity of a rock in a furnace, the rock comprising plagioclase having a plagioclase melting point and a component having a component melting point, wherein the plagioclase melting point is less than the component melting point, heating the rock in a furnace to a furnace temperature above the component melting point to form a melt, cooling the melt to a temperature between the plagioclase melting point and the component melting point, and forming a fiber from the melt.

The rock can be heterophasic igneous rock including basalt. The plagioclase melting point can be 950° C. to 1200° C. The component melting point can be from about 1400° C. to about 1600° C. The component can be a polycrystalline material including quartz and iron oxide.

The method can further include cooling the melt to a second temperature less than 1500° C. prior to forming the fiber. Forming the fiber from the melt includes spinning the melt though a bushing.

In the various exemplary embodiments discussed herein, a method of producing a continuous basalt fiber includes charging a quantity of basalt into a cold crucible induction furnace, heating the quantity of the basalt in the cold crucible furnace to a temperature of at least 2000° C. to form a homogenous melt, cooling the homogenous melt to a temperature less than 1500° C., forming the continuous basalt fiber by passing cooled the homogenous melt through a bushing.

In the various exemplary embodiments discussed herein, a basalt fiber can have a breaking tensile strength of at least about 150 MPa, a tensile modulus of at least about 10 GPa, a thermal conductivity of at least 0.03 watts/meter*Kelvin, and a volume resistivity of at least about $4*10^{12}$ ohm*meter. The basalt fiber can have a sustained operating temperature of at least about 820° C., a maximum operating temperature of at least about 982° C., and a minimum operating temperature of at least about −260° C. The basalt fiber can have a melting temperature of at least about 1450° C., a vitrification conductivity of at least about 1050° C., a glow loss of at least about 1.91%, a thermal expansion coefficient of about 8.0 ppm/° C., and a density of about 2.75 g/cm³. The basalt fiber can have a filament diameter of about 4 microns to about 23 microns, a compressive strength of at least about 3790 MPa, an elastic modulus of at least about 89 GPa, a linear expansion coefficient of at least about $5.5*10^{-6}$ m/m*K, an elongation to break of at least about 3.15%, and an absorption of humidity of less than about 0.1% at 65% relative humidity.

In the various exemplary embodiments discussed herein, a basalt fiber can have a stability at tension of about 100% at 20° C., a stability at tension of about 95% at 200° C., a stability at tension of about 82% at 400° C., a sound absorption coefficient of at least about 0.9%, an specific volume resistance of about $1*10^{12}$ ohm meter, a loss angle tangent frequency of about 0.005 MHz, a relative dielectric permeability of about 2.2 MHz. The basalt fiber can further include an additive. The additive can be an oxide including iron oxide and aluminium oxide. Other additives include inorganic oxides including silica, alumina and dolomite. Additional additives include zirconium dioxide. The additive can be carbon. The basalt fiber has less than 0.1 inclusions per meter.

In the various exemplary embodiments discussed herein, a system includes a cold crucible induction furnace for melting an igneous rock to form a melt, a water cooled tray for cooling the melt, and a bushing plate for forming a fiber from the melt. The cold crucible induction furnace operates at a frequency of 0.44 megahertz, 1.76 megahertz, 0.22 megahertz, and 0.32 megahertz.

The cold crucible induction furnace melts about 1 kilogram of basalt per less than 2.2 kilowatts of electrical power, about 1 kilogram of basalt per less than 2.0 kilowatts of electrical power, or about 1 kilogram of basalt per less than 1.5 kilowatts of electrical power. The cold crucible induction furnace operates at a temperature of at least about 1500° C., of at least about 2000° C., from about 1500° C. to about 2000° C., from about 2000° C. to about 2500° C., and from about 2500° C. to about 3000° C.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
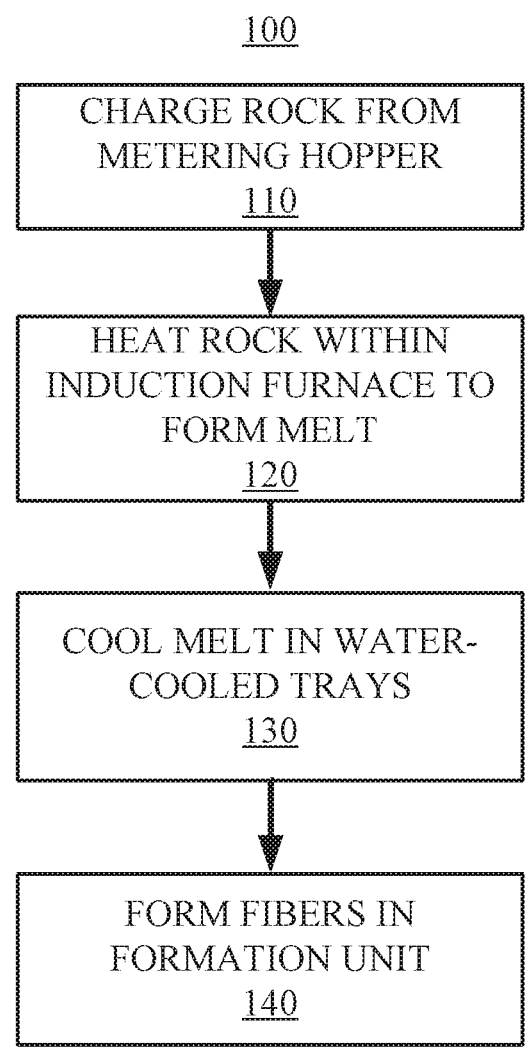
FIG. 1 is a flow chart of a process for producing a fiber from a high temperature melt, according to one embodiment of the present invention.

The features and advantages of the present invention will become more apparent from the detailed description set forth below when taken in conjunction with the drawings.

DETAILED DESCRIPTION

Following below are more detailed descriptions of various concepts related to, and embodiments of, inventive systems, methods, materials and apparatus for producing high quality basalt fibers from high temperature or superheated melts. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In some embodiments, the raw materials are washed or cleaned prior to being introduced into the furnace. Organic and combustible matter, as well as other contaminants, can be removed prior to heating to improve the quality of the melt and reduce gaseous emissions from the furnace. After washing, the raw materials can be dried and stored until ready for further processing.

In some embodiments, the initial raw material is in the form of a crushed stone or a crushed rock. By crushing the rock to a uniform size, it not only facilitates material handling and transportation of the raw material, but it also allows for precise metering of charge, i.e. the crushed rock introduced into the furnace from the metering hopper. When the crushed rock is introduced into the melt within the furnace, smaller rocks tends to melt and disperse more quickly than larger rocks.

In some embodiments, the initial raw material is silicon dioxide, an andesite, or a forsterite. In some embodiments, the initial raw material includes, but not limited to, slag, ceramics, minerals, refractory materials, diabase, dolerite, sand, limestone, cement, glass, natural rock, metals, and combinations thereof.

In some embodiments, the initial raw material is a crushed basalt rock. Basalt rocks can be complicated multicomponent, heterophasic mineralogical and chemical systems. The components of these heterophasic systems include polycrystalline materials having different chemical composition, crystalline structure, and can also comprise volcanic glass. Each these components may have different melting points. The differences between melting points of the components can be up to about 600° C. Also, the melting temperature of refractory inclusions within the basalt rock, like crystalline quartz and forsterite, can significantly exceed temperature the maximum operating temperatures achievable with gas furnaces. By way of comparison, the average temperatures of melting and production of rock fibers are 150-200° C. higher than for the melting and production of e-glass and s-glass fibers.

Table 1, below, contains the melting temperatures of mineral components which may be included in a basalt rock.

TABLE 1

| Mineral component of basalt | Melting temperature |
|---|---|
| Plagioclase | 1100-1250° C. Albite Na[AlSi$_3$O$_8$] |
| | 1550° C. Anorthite Ca[Al2Si$_2$O$_8$] |
| Pyroxene | 1540-1550° C. compositions based on MgO$_4$SiO$_2$ |
| | 1300-1315° C. compositions based on FeO$_4$SiO$_2$ |
| Olivine (MgFe)$_2$[Si$_2$O$_4$] | 1205° C. fayalite Fe$_2$SiO$_4$ |
| | 1895° C. forsterite Mg$_2$SiO$_4$ |
| Magnetite Fe$_3$O$_4$ | 1591-1597° C. |
| Quartz SiO$_2$ | 1750° C. |
| Ilmenite FeTiO$_3$ | 1365° C. |
| Apatite Ca$_5$[PO$_4$]$_3$(F, Cl, OH) | 1660° C. |

In some embodiments, the initial raw material is a blend of crushed basalt rock and an additive. Suitable additives include inorganic oxides including silica, alumina and dolomite. Additional additives include zirconium dioxide and carbon.

Basalt rocks may contain significant amounts of iron oxides which can make processing difficult. The iron oxides tend to be opaque to infrared radiation making it difficult to heat with infrared heating methods. A second problem with iron oxides is that they tend to decrease in the contact wetting angle between the melt and a platinum surface, as a consequence, there is an increased the risk of melt erratically flowing on the surface of the die plate or bushing. Also, during the process of spinning the fiber, the drawing ratio changes due to the concentration of $Fe^{2+}$ and $Fe^{3+}$ present in the melt. Increasing the concentration of $Fe^{2+}$ ions significantly increases the melt viscosity at the fiber forming temperatures, and lowers the temperature of the melt crystallization. However, another effect of iron oxide is that presence of $Fe^{3+}$ ions can increase the strength of the resulting fibers.

Traditionally, gas furnaces have been used in the preparation of mineral fibers. Typically, large gas bath ovens and multi-operator feeder type installations are used. Traditional gas furnaces require significant attention to monitor and control the quality and uniformity of incoming raw materials in order to produce fiber. This adds cost to the process and finished product. With these large ovens, it becomes possible to use spinneret plates with an increased number of holes to 800-1000 for fiber production. However large gas bathing ovens are considerably inefficient and consume large amounts of energy. The byproducts of gas combustion including poisonous gases like carbon monoxide and greenhouse gases like carbon dioxide. These gases are bad for the environment and human health.

Gas furnace operating temperatures tend to be relatively close to the melting point of basalt rock, and therefore it can take a long duration to melt the rock. Another problem is that the temperature within the furnace tends to be non-uniform with the highest temperatures being closest to the gas burners. This is due in part to the viscosity of melt reducing the convection within the melt and the heat transfer. Furthermore, the opacity to infrared radiation is another basic reason why gas furnaces ten to be low efficiency when melting rocks. It can be very difficult to melt the rock more than 10-15 centimeters from the surface. As result, there are microcrystalline refractory components within the raw materials that do not sufficiently melt.

Traditional furnaces including gas furnaces are typically lined with refractory materials. The interior of traditional furnaces contain refractory materials that resist the high heat within the furnace and protect the furnace from damage. However, the refractory materials are typically brittle materials that are prone to chipping and breakage which results in contamination of the melt.

The type of furnace used affects the physical properties of the fibers produced therein. As shown in Table 2, feeder-type gas furnaces tend to produce fibers with higher tensile strength than modular-type gas furnaces. Data on correlation between durability of basalt fibers and type of the furnace used is available from the website fiberbas.com/ru/?p=101 and is translated in Table 2, below.

TABLE 2

| Producer | The average tensile strength of the elementary basalt fiber, MPa | | Young's modulus of an elementary fiber, tensile elasticity GPa | Un-evenness of diameter, microns |
| --- | --- | --- | --- | --- |
| | Modular technology | Feeder technology | | |
| "Technobasalt". Ukraine, Slavuta* | 2100 | | 76 | 17 + 5 |
| "Ivotsteklo", Russia, Ivota* | 2550 | | 79 | 13 + 4 |
| "NTB", Ukraine, Bucha. | 2200 | | 77 | 17 + 5 |
| "Composite Plant", Russia, Serov. | 1750 | | 82 | 13 + 3 |
| "Teplozvykoizoljcia", Ukraine, Kocubinskoe. | 2100 | 3100 | 80 | 12 + 3 |
| "NPO" Vulkan", Russia, Osa. | 1850 | | 79 | 13 + 4 |
| Secotech, Korea. | 1800 | | 77 | 17 + 5 |
| Chengdu Aerospace Tuoxim Science & Technology Co., China, Chandu. | 1750 | | 77 | 17 + 6 |
| Shanghai Russia Gold Basalt Fiber, China, Shanghai. | 1650 | | 76 | 18 + 7 |
| "Kamenny Vek", Russia, Dubna. | | 3750 | 87 | 13 + 2 |
| "Sudogodsky Fiberglass Plant", Russia, Sudogda. | | 3400 | 82 | 12 + 2 |
| S-glass Lanxi Joen Fiberglass Co., Ltd., China | 4650 | | 89 | 18 + 1 |
| E-glass Hengshui Yixing Fiberglass Co., Ltd., China | 2050 | | 71 | 15 + 2 |

Table 3, below, shows the strength and degree of amorphousness of basalt fibers obtained using gas furnaces to produce a melt of basalt from quarry in Jiangsu Province, China.

TABLE 3

| Temperature of melt, ° C. | Degree of amorphous, % | Fiber diameter, microns | Tensile strength, MPa |
| --- | --- | --- | --- |
| 1300 | 25.3 | 8.3 | 1600 |
| 1350 | 26.5 | 8.4 | 1620 |
| 1400 | 35 | 8.6 | 1870 |
| 1450 | 50 | 8.5 | 2010 |
| 1500 | 80 | 8.7 | 2300 |
| 1550 | 95 | 8.6 | 2500 |
| 1600 | 96 | 8.7 | 2550 |

Table 3 helps illustrate the correlation existing between the melt temperature, the degree of amorphousness of the resulting fiber and tensile strength. It also shows the difficulty of reaching complete amorphousness by using gas furnaces. It is readily apparent that existence of microcrystalline inclusions creates defects in the fiber and negatively affects its tensile strength. At a melt temperature of 1600° C. the consumption of gas required to heat one kilogram of melt increases dramatically over the consumption of gas at lower temperatures. Also, at temperatures of 1600° C. and above, the destruction of the refractory lining of the furnace and contamination of the melt is dramatically increased. Both of these factors negatively affect the cost and quality of the fiber.

FIG. 1 is a block diagram of a process 100 for producing basalt fibers from a high temperature melt according to one embodiment. A charge, comprising crushed basalt rock of a predetermined size and optionally comprising additives, is fed from a metering hopper in step 110. In some embodiments, the basalt rock is crushed to fit through a screen that is 8 centimeters square, 7 centimeters square, 6 centimeters square, 5 centimeters square, 4 centimeters square, 3 centimeters square, 2.5 centimeters square, 2 centimeters square, 1.5 centimeters square, 1.25 centimeters square, 1 centimeters square, 0.75 centimeters square, 0.5 centimeters square, 0.25 centimeters square, #4 mesh, #6 mesh, #10 mesh, #16 mesh, #20 mesh, #30 mesh, #40 mesh, #50 mesh, #90 mesh, and #200 mesh, including all ranges and subranges therebetween. During steady state operation, the metering hopper delivers a constant mass flow rate of the charge into an induction furnace to maintain the amount of basalt rock within the furnace.

In step 110, the induction furnace heats the basalt rock to form the melt. In some embodiments, the melt has a temperature of at least about 1500° C., at least about 1550° C., at least about 1600° C., at least about 1650° C., at least about 1700° C., at least about 1750° C., at least about 1800° C., at least about 1850° C., at least about 1900° C., at least about 1950° C., at least about 2000° C., at least about 2050° C., at least about 2100° C., at least about 2150° C., at least about 2200° C., at least about 2250° C., at least about 2300° C., at least about 2350° C., at least about 2400° C., at least about 2450° C., at least about 2500° C., at least about 2500° C., at least about 2600° C., at least about 2650° C., at least about 2700° C., at least about 2750° C., at least about 2800° C., at least about 2850° C., at least about 2900° C., at least about 2950° C., at least about 3000° C., and at least about 3050° C. In some embodiments, the melt has a temperature from about 1500° C. to about 1600° C., from about 1500° C. to about 1700° C., from about 1500° C. to about 1800° C., from about 1500° C. to about 1900° C., from about 1500° C. to about 2000° C., from about 1600° C. to about 1700° C., from about 1600° C. to about 1800° C., from about 1600° C. to about 1900° C., from about 1600° C. to about 2000° C., from about 1700° C. to about 1800° C., from about 1700° C. to about 1900° C., from about 1700° C. to about 2000° C., from about 1800° C. to about 1900° C., from about 1800° C. to about 2000° C., from about 1900° C. to about 2000° C., from about 2000° C. to about 2100° C., from about 2000° C. to about 2200° C., from about 2000° C. to about 2300° C., from about 2000° C. to about 2400° C., from about 2000° C. to about 2500° C., from about 2500° C. to about 2600° C., from about 2500° C. to about 2700° C., from about 2500° C. to about 2800° C., from about 2500° C. to about 2900° C., from about 2500° C. to about 3000° C., from about 2600° C. to about 2700° C., from about 2600° C. to about 2800° C., from about 2600° C. to about 2900° C., from about 2600° C. to about 3000° C., from about 2700° C. to about 2800° C., from about 2700° C. to about 2900° C., from about 2700° C. to about 3000° C., from about 2800° C. to about 2900° C., from about 2800° C. to about 3000° C., from about 2900° C. to about 3000° C., and about 1500° C. to about 3000° C., including all ranges and subranges therebetween. In some embodiments, the melt is superheated, that is, the melt is heated to a temperature above its melting point. By superheating the melt, it helps to insure that each of the components of the basalt has melted and avoids heterogeneous pockets of components of microcrystalline inclusions within the melt. Superheating the melt has the additional advantages of volatilizing impurities which are removed as gases.

As the basalt rock is heated, volatile compounds are released from the melt in the form of gases. The gaseous emissions are comprised of the most weakly bonded components of the basalt rock that are removed from the melt and the furnace. By heating the basalt rock to higher temperatures, the melt is purified of volatile compounds thus improving the homogeneity of the melt. Additionally, the viscosity of the melt is reduced by higher temperatures which help to further liberate the volatile compounds from the melt. Typically, furnace temperatures from about 2100° C. to about 2300° C. result in an intensive release of gases, though lower furnace temperatures also result in out gassing.

In step 120, the melt is removed from the furnace and cooled in water-cooled trays before travelling to the fiber formation unit. In some embodiments, the water-cooled trays reduce the temperature of the melt to less than about 2500° C., less than about 2400° C., less than about 2300° C., less than about 2200° C., less than about 2100° C., less than about 2000° C., less than about 1900° C., less than about 1800° C., less than about 1700° C., less than about 1600° C., and less than about 1500° C. In some embodiments, the water-cooled trays reduce the temperature of the melt to a temperature in a range from about 2500° C. to about 2000° C., from about 2500° C. to about 2100° C., from about 2500° C. to about 2200° C., from about 2500° C. to about 2300° C., from about 2500° C. to about 2400° C., from about 2400° C. to about 2000° C., from about 2400° C. to about 2100° C., from about 2400° C. to about 2200° C., from about 2400° C. to about 2300° C., from about 2300° C. to about 2000° C., from about 2300° C. to about 2100° C., from about 2300° C. to about 2200° C., from about 2200° C. to about 2000° C., from about 2200° C. to about 2100° C., from about 2100° C. to about 2000° C., from about 2000° C. to about 1500° C., from about 2000° C. to about 1600° C., from about 2000° C. to about 1700° C., from about 2000° C. to about 1800° C., from about 2000° C. to about 1900° C., from about 1900° C. to about 1500° C., from about 1900° C. to about 1600° C., from about 1900° C. to about 1700° C., from about 1900° C. to about 1800° C., from about 1800° C. to about 1500° C., from about 1800° C. to about 1600° C., from about 1800° C. to about 1700° C., from about 1700° C. to about 1500° C., from about 1700° C. to about 1600° C., from about 1600° C. to about 1500° C., from about 1600° C. to about 1200° C., from about 1500° C. to about 1200° C., from about 1400° C. to about 1200° C., from about 1300° C. to about 1200° C., from about 1400° C. to about 1300° C., about 1350° C., and from about 2500° C. to about 1200° C., including all ranges and subranges therebetween.

In step 140, fibers are formed from the cooled melt within the fiber formation unit. In some embodiments, continuous long fibers are formed within the fiber formation unit. Continuous fibers can be sold in the form of direct roving, complex rovings and twisted yarns and chopped strands. Continuous long fibers can be processed into various core and hybrid yarns, fabrics, tapes, meshes, grids, needle punched mats and nonwoven fabrics. Also rovings can be directly processed on a pultrusion machine into the elementary unidirectional composite materials such as rebars (reinforcing bars), rods and other profiles, or by means of winding machines into pipes, containers in the form of wound bodies, and also into composite grating. In some embodiments, staple fibers are formed within the fiber formation unit. These fibers may be processed into micro fillers for composite materials, tufted mats and batts, needle punched mats, granulated fibers, basalt wool insulations, and cylinders.

Figure 2:
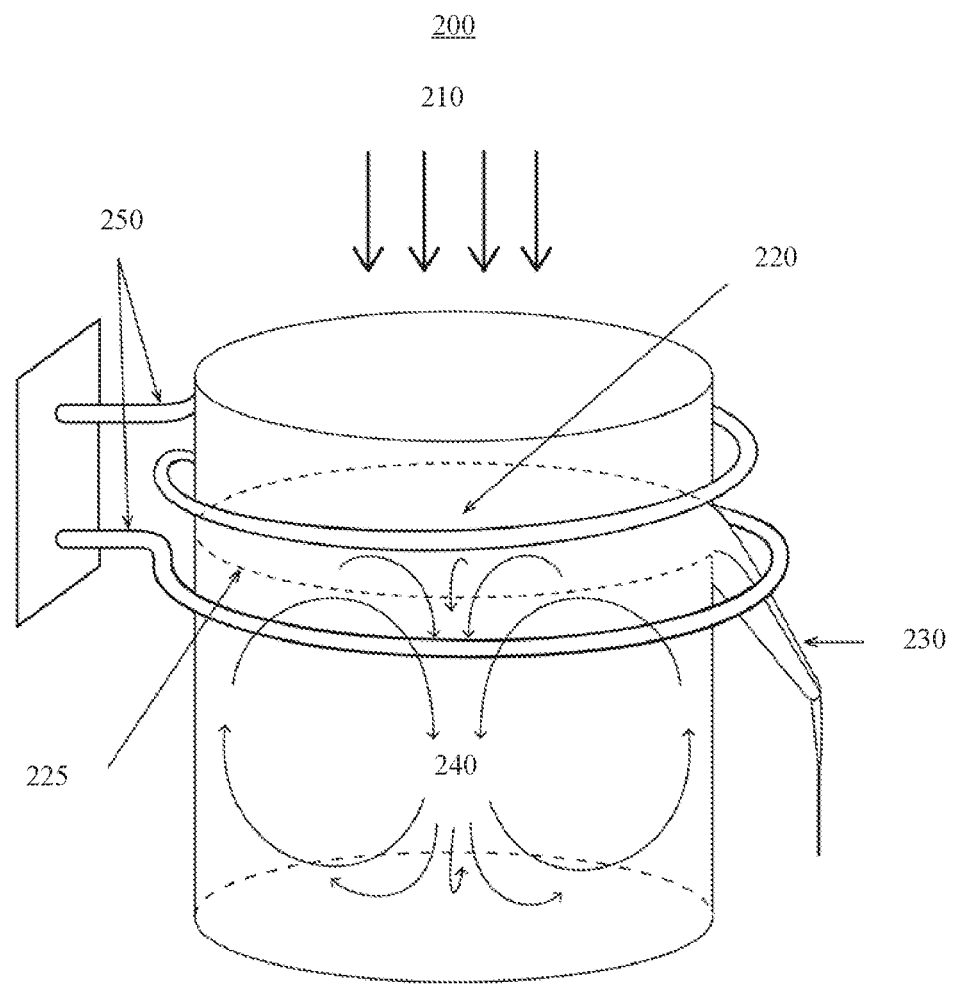
FIG. 2 is a diagram of an induction furnace, according to one embodiment of the present invention.

FIG. 2 shows a diagram of an induction furnace 200 for producing a high temperature melt, according to one embodiment. In one embodiment, the induction furnace 200 is a cold crucible, induction furnace. In one embodiment, the induction furnace 200 is a coreless induction furnace. In one embodiment, the induction furnace is a skull crucible induction furnace.

The charge 210 is fed into the top of the induction furnace 200, which maintains melt level 225 during steady state operation. The outlet 230 discharges the melt 240 from induction furnace 200. In one embodiment, the rate of discharge through outlet 230 can be controlled by varying the rate of the charge 210 input into the induction furnace 200. The surface of the melt 220 is a location where the melt temperature can be measured using a three-beam laser pyrometer. For example, the temperature of the melt 240 can be measured using a Pyrolaser® infrared thermometer having a temperature range of 850° C. to 3000° C. available from The Pyrometer Instrument Company, Inc., Windsor, N.J., USA.

In one embodiment, the induction furnace 200 is powered by alternating current electricity which flows through induction coils 250. In some embodiments, the induction coils 250 are water-cooled copper tubes. The induction coils 250 are electrically isolated from other parts of the induction furnace 200. In some embodiments, the melt level 225 of the induction furnace 200 is between the levels of two of the induction coils 250. In some embodiments, induction furnace 200 is powered by and alternating current having a frequency of 0.22 MHz. In some embodiments, induction furnace 200 is powered by and alternating current having a frequency of 0.32 MHz. In some embodiments, induction furnace 200 is powered by an alternating current having a frequency of 0.44 MHz. In some embodiments, induction furnace 200 is powered by and alternating current having a frequency of 1.76 MHz.

The frequency of the alternating current affects the penetration of magnetic field. For the frequency of 0.44 MHz, the penetration of the magnetic field into the crucible is about 6 cm to about 9 cm. Therefore the heating of the melt occurs in the top part of the crucible within about 10 cm high from the surface 220 and in an area adjacent to an internal surface about 6 cm to about 9 cm from the copper side plates. It has been found that higher frequencies are more suitable for achieving higher temperatures in the melt 240.

Due to convectional currents, the melt 240 circulates with the induction furnace 200. The electromagnetic interaction pushes away the melt from a surface of copper plates and towards a cylinder axis. Strong convectional currents force the melt inside the heated region to move upward. The melt 240 tends to circulate in a toroidal pattern which promotes fast mixing and homogeneity of the melt 240. Near a surface of plates the melt moves up and towards an axis of the furnace. In the center of the furnace, the melts moves down. This heavy mixing flow quickly carries away furnace charge which continuously moves from the melt surface to the depths of the crucible. By maintaining the melt 240 at higher temperatures, the viscosity of the melt 240 is reduced which further promotes convectional flow, mixing, and the overall homogeneity of the melt 240.

Many rocks, like Basalt, are dielectric materials in a solid state, however, when heated, the melt becomes conductive. The alternating current flowing through induction coils 250 induces eddy currents within the melt 240. In one embodiment, about 2.5 kilowatts of electricity is required to melt about 1 kilogram of Basalt. In one embodiment, less than about 2.2 kilowatts of electricity is required to melt about 1 kilogram of Basalt. In one embodiment, less than about 2.0 kilowatts of electricity is required to melt about 1 kilogram of Basalt. In one embodiment, less than about 1.5 kilowatts of electricity is required to melt about 1 kilogram of Basalt.

In some embodiments, the inner surface of the induction furnace 200 contains no refractory materials including no refractory brick, quartz, glass, ceramics, and/or inorganic, nonmetallic materials. In some embodiments, the inner surface of the induction furnace 200 comprises copper plates. The copper plates are water-cooled and are electrically isolated from each other. The copper plates are sealed on the outside of the induction furnace 200 by a refractor material such as quartz or glass. During operation, a layer of protective basalt forms on the inside surface of the copper plates. In some embodiments, the top of induction furnace 200 is uncovered.

Copper plates are opaque to electromagnetic waves. In some embodiments, in the top portion of each copper plate there are two vertical sections for creation of additional areas of penetration of the electromagnetic field into the melt. The field penetrates into the crucible by diffraction through vertical slits between and within the plates. In some embodiments, the bottom of a furnace 200 is made from several flat water-cooled copper plates. In each embodiment, the bottom copper plates are isolated from each other and from the side copper plates. To suppress generation or introduction of any foreign currents, the induction furnace 200 can be mounted on an isolating support.

In one embodiment, the induction furnace 200 is configured to receive and to melt about 45 to 200 kilograms of basalt per hour. In one embodiment, the induction furnace 200 is configured to melt at least about 100 kilograms of basalt.

Unlike gas furnaces which are costly to operate and relatively inefficient, electric induction furnaces according the present disclosure are energy efficient and economical to operate. Induction furnaces, according the present disclosure, also do not produce harmful combustion gases which can pollute the environment and can require expensive exhaust systems. Electric induction furnaces also do not suffer from the risk of explosion do to the buildup of non-combusted natural gas or propane within the furnace.

Induction furnaces, according the present disclosure, also heat the melt from the inside rather than from the outside like gas furnaces. Heat the inside of the melt rather than heating a surface of the melt is more efficient and promotes convectional mixing.

As discussed above, induction furnaces, according the present disclosure, also do not contain a refractory lining. By not having a refractory lining on the interior of the induction furnace, there is no chance for contamination from the refractory lining breaking off.

The melt 240 is discharged from the furnace 200 through outlet 230. In one embodiment, the outlet 230 is a copper water-cooled tap-hole. In one embodiment, a copper water-cooled gate (not shown) is attached to the outlet 230 to inhibit and to control the flow of the melt 240. The temperature of the melt 240 at the outlet 230 is about 2000° C. to about 2100° C., which is about 200° C. lower than the temperature of the melt surface 220 in the induction furnace 200. The viscosity of the melt 240 in the induction furnace 200 substantially below that needed for fiber production process. Therefore, between the fiber-forming unit and induction furnace 200 melt is cooled thereby raising its viscosity and cohesiveness.

In one embodiment, the melt discharged from the induction furnace is cooled by traveling through an inclined water-cooled copper tray. The length and angle of the tray selected in such a way so as to deliver the melt to the fiber-formation unit.

Advantages of the high temperature melt include substantially complete homogeneity and substantial amorphicity. In some embodiments, the melt can be about at least 80% amorphous, about at least 90% amorphous, about at least 95% amorphous, about at least 98% amorphous, and greater than about 99% amorphous. Another advantage of the superheated melt is that the basalt fiber can be spun at a lower temperature. This is because of an absence of a nucleus or a microcrystalline inclusion to stimulate recrystallization of the melt. Spinning at lower temperatures results in less wear on the bushings which reduces the consumption of precious metals used for constructing the bushings. An advantage of the system, apparatus, and method of the present disclosure is that there is a significant expansion of the possible sources of raw materials for production of fibers. Though the present disclosure discusses basalt rock in detail, other types of rocks and inorganic materials are equally suited to the processing technology described herein. Furthermore, high temperature melts also afford ample opportunities for modification of physical, mechanical and chemical properties of fibers by the ability to incorporate additives that are generally unsuitable for lower temperature processes.

Figure 3:
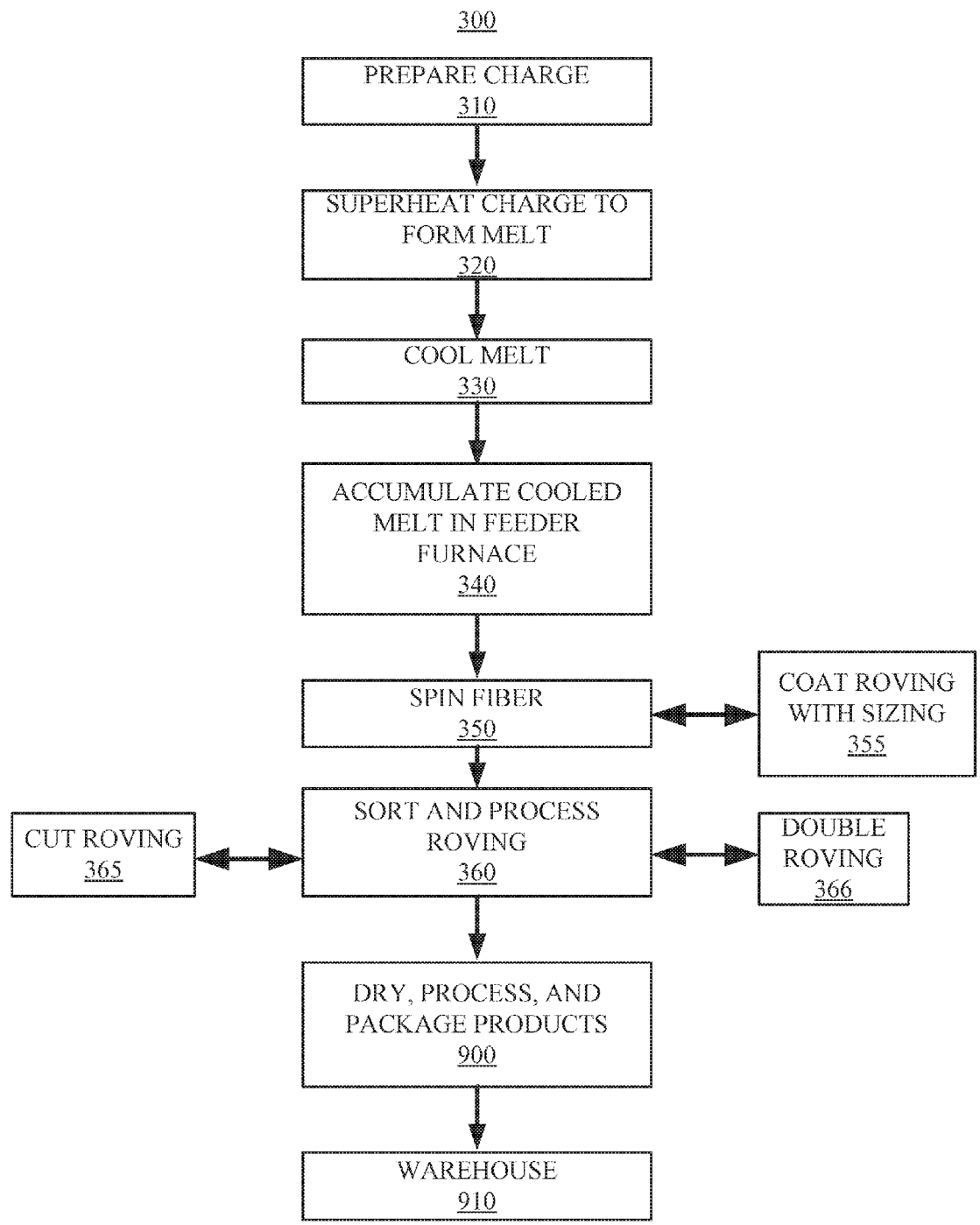
FIG. 3 is a flow chart of a process for producing a fiber from a high temperature melt, according to one embodiment of the present invention.

In one embodiment, the fiber-formation unit produces a continuous fiber or a plurality of fibers, i.e. a roving. FIG. 3 shows a flow chart for a process 300 of producing a continuous fiber. In step 310, a charge is prepared. The charge is introduced into the furnace and superheated to form a melt in step 320. The melt is cooled in step 330 after it leaves the furnace. A feeder furnace is optionally used to accumulate the cooled melt in step 340 prior to the melt being spun into a fiber. In step 350, the melt is spun into the fiber by passing the melt though a bushing in a bushing unit. In some embodiments, the bushing unit has a plurality of bushings. In some embodiments, each bushing produces more than 200 fibers, more than 400 fibers, more than 800 fibers, or more than 1000 fibers. An optional sizing material can be prepared and coated onto the roving in step 355. Sizing materials include aqueous coating such as a paraffin emulsion, a PVA emulsion, a terpene oil emulsion, as well as silicone-based coatings. Sizing aids with processing the fibers during the continuous fiber manufacturing process 300, as well as later conversion processing of the continuous fiber into textiles, ropes, composites, meshes, rebar, and into other end products. The plurality of fibers or roving exiting the bushing unit or optional sizing coating step are cooled, sorted, and further processed in step 360. In step 365, the roving can be optionally cut or chopped. In step 366, the roving can be optionally double, woven, braided, or otherwise combined together. In step 900, the sized roving is dried prior to packaging on spools or in other configurations. The roving can also be further processed including quality control of a roving to insure compliance with customer requirements, marking, and packaging. Further processing also includes special types of processing like metallization, coloring and others. The finished product can be then warehoused in step 910 prior to shipment to an end customer.

In the various exemplary embodiments discussed herein, a method of producing a fiber includes charging the quantity of a rock in a furnace, the rock comprising plagioclase having a plagioclase melting point and a component having a component melting point, wherein the plagioclase melting point is less than the component melting point, heating the rock in a furnace to a furnace temperature above the component melting point to form a melt, cooling the melt to a temperature between the plagioclase melting point and the component melting point, and forming a fiber from the melt.

The rock can be heterophasic igneous rock including basalt. The plagioclase melting point can be 950° C. to 1200° C. The component melting point can be from about 1400° C. to about 1600° C. The component can be a polycrystalline material including quartz and iron oxide.

An advantage of a fiber produced according to the present disclosure from a superheated melt includes less defects that result in tensile weakness and breakage. This results in less manufacturing scrap and process downtime. Also, because the fibers are less prone to breakage, more bushings can be used in the bushing unit, and bushings with a more openings can be used to produce fibers at a greater rate.

The superheated melt also results in a higher quality fiber that has superior tensile strength. Because of the higher individual fiber performance, the fiber can be used in a greater number of end use applications that conventional fibers are generally unsuitable for.

Another advantage is that the basalt super thin fibers (BSTFs) can be produced that would be difficult to mass produce with conventional melts. BSTFs prepared in gas furnaces from conventional melts are a two-step process for production, called duplex process. The first stage of process produces primary basalt fibers using inefficient modular type installations with 200 hole bushings. In the second stage, the primary fibers are passed through gas slot-hole torches. A supersonic stream of a burning gas with a temperature about 1700° C., repeatedly melts primary fibers which are formed into BSTFs. The second stage of the conventional process demands much more energy than the first stage. It is clear, that BSTFs made with a conventional duplex process is more expensive than BSTFs prepared according to the present invention. The presently disclosed technology of superheated melts allows for manufacturing BSTFs with single-stage process which significantly reduces energy consumption and reduces consumption of precious metals found in the bushings. BSTFs produced according to the system and methods disclosed herein results in a six to seven times increase in productivity over conventionally produced BSTFs.

Figure 4:
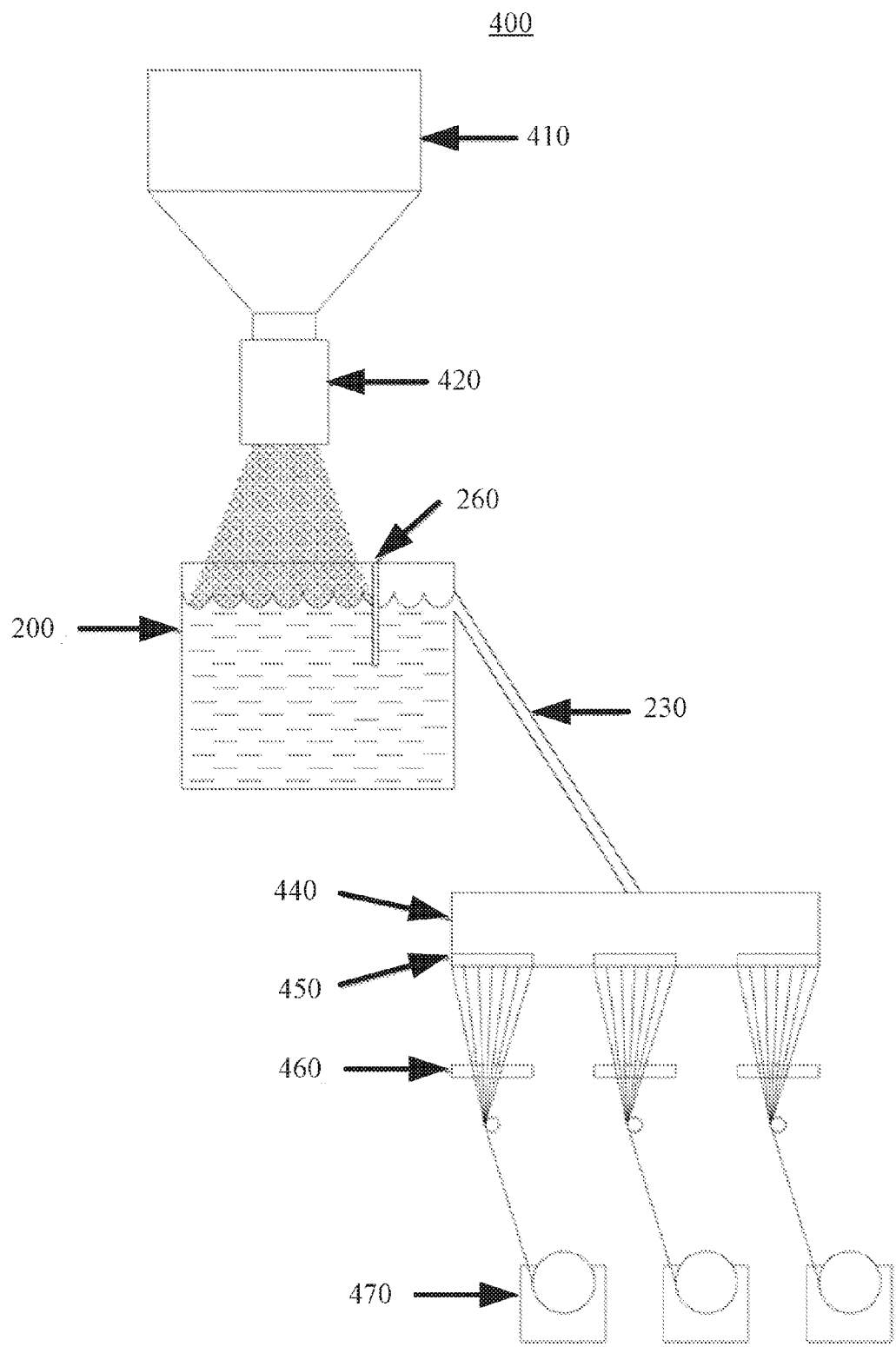
FIG. 4 is a diagram of a system for producing a continuous basalt fiber from a high temperature melt, according to one embodiment of the present invention.

FIG. 4 shows a diagram of a system for producing continuous basalt fibers. A metering hopper 410 contains crushed basalt rock. A portioning device 420 is connected to the metering hopper 410 and provides a constant mass flow rate of crushed basalt rock to the induction furnace 200. A water-cooled baffle 260 can be used to prevent any unmelted basalt from being discharged from the induction furnace 200. The water-cooled baffle 260 also inhibits any impurities present in the crushed basalt rock that accumulate on the surface of the melt from being discharged from the furnace. In one embodiment, the water-cooled baffle 260 is made of copper. The melt in the furnace 200 can flow under the water-cooled baffle 260 and out of the furnace 200 through water-cooled tray 230. In one embodiment, the water-cooled tray 230 is made of copper.

The cooled melt flows from the water-cooled tray 230 to the fiber formation unit. In one embodiment, the fiber formation unit includes an electrically heated feeder furnace 440 for accumulating the cooled melt prior to spinning. The fiber formation unit includes one or more bushings 450 for spinning the melt into a fiber. In one embodiment bushing 450 is made of a precious metal with a high temperature melting point. Suitable precious metals include platinum, rhodium, and combinations thereof. In one embodiment bushing 450 is made of a ceramic material with a high temperature melting point.

The fibers may be grouped together to form a roving as they pass into a sizing applicator 460. In one embodiment, the sizing applicator 460 is a bath containing a sizing material that the roving is immersed within. In one embodiment, the sizing applicator 460 is one or more transfer rollers that apply the sizing to the outside surface of the fibers. In one embodiment, the sizing applicator 460 is a sprayer or curtain coater that applies the sizing to the outside surface of the fibers. Depend on the sizing material, a dryer (not shown) can be used to dry the sixing material. After drying, the fibers are cut to length and wound onto bobbins by winding machine 470.

The fiber can be 1 micron to 3 microns. The fiber can also be 4 microns to 13 microns. The fiber can also be 7 microns to 13 microns. The fiber can also be 8 microns to 10 microns.

In the various exemplary embodiments discussed herein, a basalt fiber can have a breaking tensile strength of at least about 150 MPa, a tensile modulus of at least about 10 GPa, a thermal conductivity of at least 0.03 watts/meter*Kelvin, and a volume resistivity of at least about $4*10^{12}$ ohm*meter. The basalt fiber can have a sustained operating temperature of at least about 820° C., a maximum operating temperature of at least about 982° C., and a minimum operating temperature of at least about −260° C. The basalt fiber can have a melting temperature of at least about 1450° C., a vitrification conductivity of at least about 1050° C., a glow loss of at least about 1.91%, a thermal expansion coefficient of about 8.0 ppm/° C., and a density of about 2.75 g/cm³. The basalt fiber can have a filament diameter of about 4 microns to about 23 microns, a compressive strength of at least about 3790 MPa, an elastic modulus of at least about 89 GPa, a linear expansion coefficient of at least about $5.5*10^{-6}$ m/m*K, an elongation to break of at least about 3.15%, and an absorption of humidity of less than about 0.1% at 65% relative humidity.

In the various exemplary embodiments discussed herein, a basalt fiber can have a stability at tension of about 100% at 20° C., a stability at tension of about 95% at 200° C., a stability at tension of about 82% at 400° C., a sound absorption coefficient of at least about 0.9%, an specific volume resistance of about $1*10^{12}$ ohm meter, a loss angle tangent frequency of about 0.005 MHz, a relative dielectric permeability of about 2.2 MHz. The basalt fiber can further include an additive. The additive can be an oxide including iron oxide and aluminium oxide. Other additives include inorganic oxides including silica, alumina and dolomite. Additional additives include zirconium dioxide. The additive can be carbon. The basalt fiber has less than 0.1 inclusions per meter.

Figure 5:
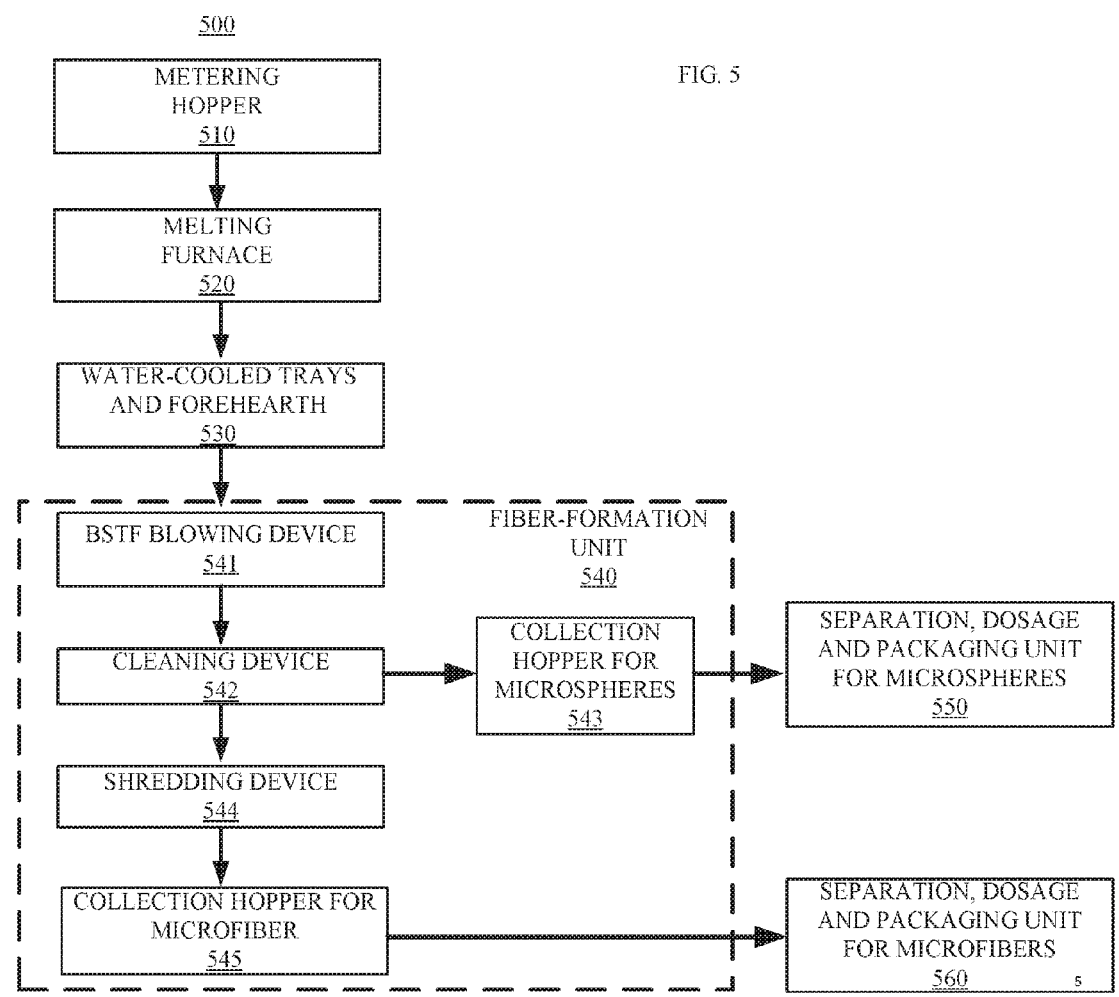
FIG. 5 is a flow chart of a process for producing microspheres and microfibers from a high temperature melt, according to one embodiment of the present invention.

FIG. 5 shows a flow chart for a process 500 of producing a basalt microspheres and basalt microfibers. Microspheres are solid balls of basalt without any entrapped air. In step 510, a charge is prepared by loading the charge into a metering hopper. The charge is introduced into the furnace and superheated to form a melt in step 520. The melt is cooled in step 530 after it leaves the furnace by passing the melt through water-cooled trays. A forehearth is optionally used to accumulate the cooled melt prior to the melt being spun into a fiber by the fiber formation unit 540. In step 541, the melt is blown into BSTFs by passing the melt though a BSTF blowing device. In some embodiments, the BSTF blowing device comprises a Hartman whistle operating with high-speed jet of air flowing at about Mach 2 or about 700 meters per second against the melt. The BSTFs exiting the bushing unit are cooled and further processed in an optional cleaning device in step 542. In some embodiments, the microspheres are in the shapes of rods or dumbbell. The cleaning device separates microspheres from the microfibers.

In step 543, the microspheres are collected in a hopper. In step 550, the microspheres are further processed in a separation, dosage, and packaging unit. In one embodiment, the microspheres are sieved and classified. Microspheres and microfibers are suitable for reinforcing composite materials and have end use applications ranging from concrete to stomatology.

In some embodiments, the microspheres have an average diameter from about 0.5 microns to about 3 microns. In some embodiments, the microspheres have an average length from about 7 microns to about 125 microns.

After the optionally cleaning in step 542, the BSTF passes to a shredding device in step 544. The shredding device chops or grinds the fiber to a uniform length to form a staple fiber or a microfiber. In step 545, the microfibers are collected in a hopper and then sent for further processing. In step 560, the microfibers are further processed in a separation, dosage, and packaging unit.

Figure 6:
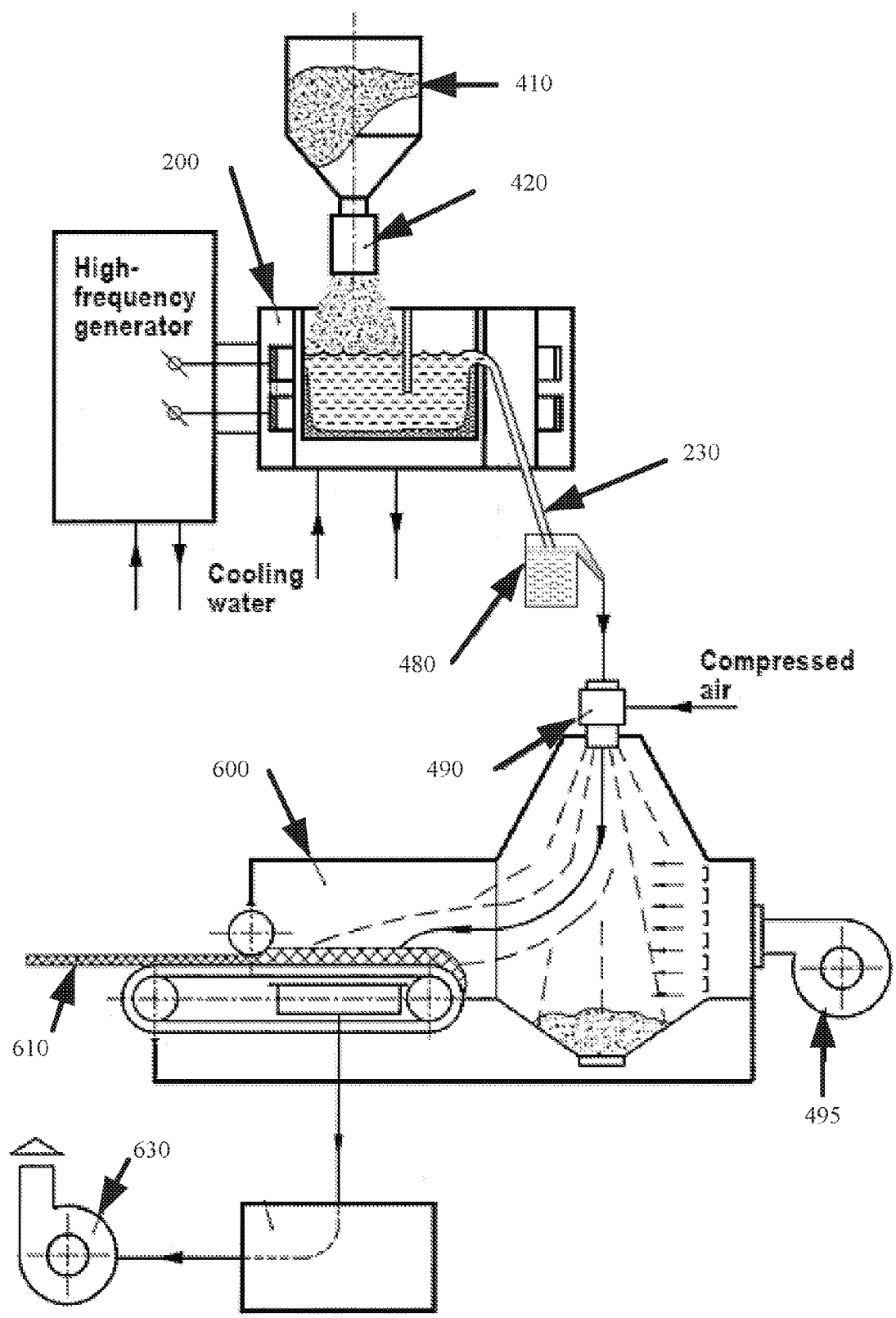
FIG. 6 is a diagram of a system for producing microspheres and microfibers from a high temperature melt, according to one embodiment of the present invention.

FIG. 6 shows a diagram of a system for producing super thin fibers, microfibers, and microspheres. A metering hopper 410 contains crushed basalt rock. A portioning device 420 is connected to the metering hopper 410 and provides a constant mass flow rate of crushed basalt rock to the induction furnace 200. A high-frequency generator powers the induction coils to superheat the melt. Cooling water passes through the outside walls and bottom of the induction furnace 200 to prevent the induction furnace from overheating. As the melt leaves the induction furnace 200, the melt is cooled in water-cooled tray 230.

The cooled melt flows from the water-cooled tray 230 to the forehearth 480. In one embodiment, the forehearth 480 accumulates the cooled melt prior to fiber formation. The forehearth 480 passes the cooled melt to a fiber blowing device 490.

In some embodiments, the fiber blowing device 490 forms super thin fibers with a diameter of about 1 micron to about 3 micron. The fiber blowing device 490 includes a special head which blow a high-speed jet of air flow at more than two times the speed of sound (measured in air) against the melt. The jet of air creates a powerful ultrasonic vibration that is excited by ring inside the special head called Hartmann whistle. The forces and turbulence in fiber blowing device 490 causes the super thin fiber to form microfibers or staple fibers. In some instances, microspheres are formed in the fiber blowing device 490.

A blower 495 blows the lighter fibers toward an exhaust filter 610. The heavier microspheres drop straight down and are collected at a bottom in a hopper. The staple or microfibers collect on the exhaust filter 610. A camera 600 allows an operator to remotely monitor the process. A fan 630 induces a draft on exhaust filter 610 to further facilitate the collection of the microfibers. In one embodiment, a disk centrifuge is used to separate microspheres and microfibers.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. While various inventive embodiments have been described and illustrated herein in terms of a basalt rock, those of ordinary skill in the art will readily appreciate that the inventive concepts are applicable to other raw materials including, but not limited to, slag, ceramics, minerals, refractory materials, diabase, dolorite, sand, limestone, cement, glass, natural rock, metals, and combinations thereof. Also, while various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

As used herein in the specification and in the claims, "about" should be understood to mean plus or minus ten percent of the modified value (+/−10%). For example about 5 includes a range from 4.5 to 5.5. For the purposes of this specification and claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of producing a continuous basalt fiber, comprising:
    charging a quantity of basalt into an induction furnace, the induction furnace having an interior comprising copper plates and containing substantially no refractory lining;
    inductively heating at least about 100 kilograms of basalt in the induction furnace to a first temperature of at least about 2500° C. to form a melt;
    cooling the melt to a temperature below 1500° C. by passing the melt through a water cooled tray to form a cooled melt; and forming the continuous basalt fiber from the cooled melt, wherein 1 kilogram of continuous basalt fiber is produced using less than 2.2 kilowatts of electrical power, and wherein the continuous basalt fiber is from about 1 microns to about 3 microns in diameter.

2. The method of claim 1 wherein the induction furnace is a cold crucible induction furnace.

3. The method of claim 1, wherein the melt is substantially homogeneous.

4. The method of claim 1 wherein forming the continuous basalt fiber from the cooled melt includes spinning the melt though a bushing.

5. The method of claim 4, further comprising:
applying a spin finish to the continuous basalt fiber.

6. The method of claim 5, wherein the spin finish contains silicone.

7. A method of producing a continuous fiber, comprising:
charging a quantity of a rock in an induction furnace, the induction furnace having an interior comprising copper plates and containing substantially no refractory lining, the rock comprising plagioclase having a plagioclase melting point and a component having a component melting point, wherein the plagioclase melting point is less than the component melting point;
inductively heating the quantity of the rock in the induction furnace to a furnace temperature above the component melting point to form a superheated melt, wherein the superheated melt is at least about 98% amorphous and the furnace temperature is at least about 2500° C.;
cooling the superheated melt to a temperature between the plagioclase melting point and the component melting point by passing the superheated melt through a water cooled tray to form a cooled melt; and
forming the continuous fiber from the cooled melt.

8. The method of claim 7, wherein the rock is basalt.

9. The method of claim 8, wherein the plagioclase melting point is from about 950° C. to about 1200° C.

10. The method of claim 9, wherein the component melting point is from about 1400° C. to about 1600° C.

11. The method of claim 7, wherein the component is quartz.

12. The method of claim 7, wherein the component is an iron oxide.

13. The method of claim 7, wherein forming the continuous fiber from the melt includes spinning the cooled melt though a bushing.

14. A method of producing a continuous basalt fiber, comprising:
charging a quantity of basalt into a cold crucible induction furnace wherein the induction furnace has an interior comprising copper plates and containing substantially no refractory lining;
inductively heating the quantity of the basalt in the cold crucible induction furnace to a temperature of at least about 2500° C. to form a homogenous melt, wherein the cold crucible induction furnace heats about 1 kilogram of basalt per less than 2.2 kilowatts of electrical power;
cooling the homogenous melt to a temperature less than about 1500° C. by passing the melt through a water cooled tray to form a cooled homogenous melt; and
forming the continuous basalt fiber by passing the cooled homogenous melt through a bushing.

15. The method of claim 14, wherein the cold crucible induction furnace heats about 1 kilogram of basalt per less than 2.0 kilowatts of electrical power.

16. A method of producing a continuous basalt fiber from a homogeneous melt, comprising:
charging a quantity of basalt rock into a cold crucible induction furnace; inductively heating the quantity of the basalt in the cold crucible induction furnace to a temperature of at least about 2500° C. to form a homogenous melt having a viscosity of less than about 500 cP, wherein the cold crucible induction furnace includes an interior comprising copper plates and containing substantially no refractory lining;
wherein the cold crucible induction furnace heats about 1 kilogram of basalt per less than 2.2 kilowatts of electrical power;
cooling the homogenous melt to a temperature less than about 1500° C. by passing the homogenous melt through a water cooled tray;
forming the continuous basalt fiber by passing the cooled homogenous melt through a bushing;
applying a spin finish to the continuous basalt fiber.

17. The method of claim 16, wherein the cold crucible induction furnace operates at a frequency of about 0.22 megahertz, 0.32 megahertz, 0.44 megahertz, or 1.76 megahertz.

18. The method of claim 14, wherein the cold crucible induction furnace operates at a frequency of about 0.22 megahertz, 0.32 megahertz, 0.44 megahertz, or 1.76 megahertz.

* * * * *